United States Patent

Wiederrich

[11] 4,005,607
[45] Feb. 1, 1977

[54] STATIC WHEEL BALANCER
[75] Inventor: James L. Wiederrich, Lodi, Calif.
[73] Assignee: FMC Corporation, San Jose, Calif.
[22] Filed: Nov. 20, 1975
[21] Appl. No.: 633,894
[52] U.S. Cl. .................................................. 73/483
[51] Int. Cl.² ......................................... G01M 1/04
[58] Field of Search ............ 73/482, 483, 484, 485, 73/487

[56] References Cited
UNITED STATES PATENTS

| | | | |
|---|---|---|---|
| 2,367,787 | 1/1945 | Lannen | 73/482 X |
| 3,289,483 | 12/1966 | Slemmons | 73/484 X |
| 3,388,589 | 6/1968 | Campbell | 73/483 X |

*Primary Examiner*—James J. Gill
*Attorney, Agent, or Firm*—C. E. Tripp

[57] ABSTRACT

A static vehicle wheel balancing head has a base mounting an upright post terminating in a concave spherical anvil surface that supports three support balls. The balancing head has the usual means for mounting a wheel and has a single socket mounted pivot ball that is supported by the three support balls. The pivot ball is preloaded by a Belleville washer assembly and the preload is adjustable by a threaded plug. Opposed faces on the post and the balancing head are normally spaced by a small distance. Under shock loads, the pivot ball on the balancing head is forced up into its socket, compressing the Belleville washers. This brings the opposed faces into engagement and protects the pivot ball assembly.

4 Claims, 2 Drawing Figures

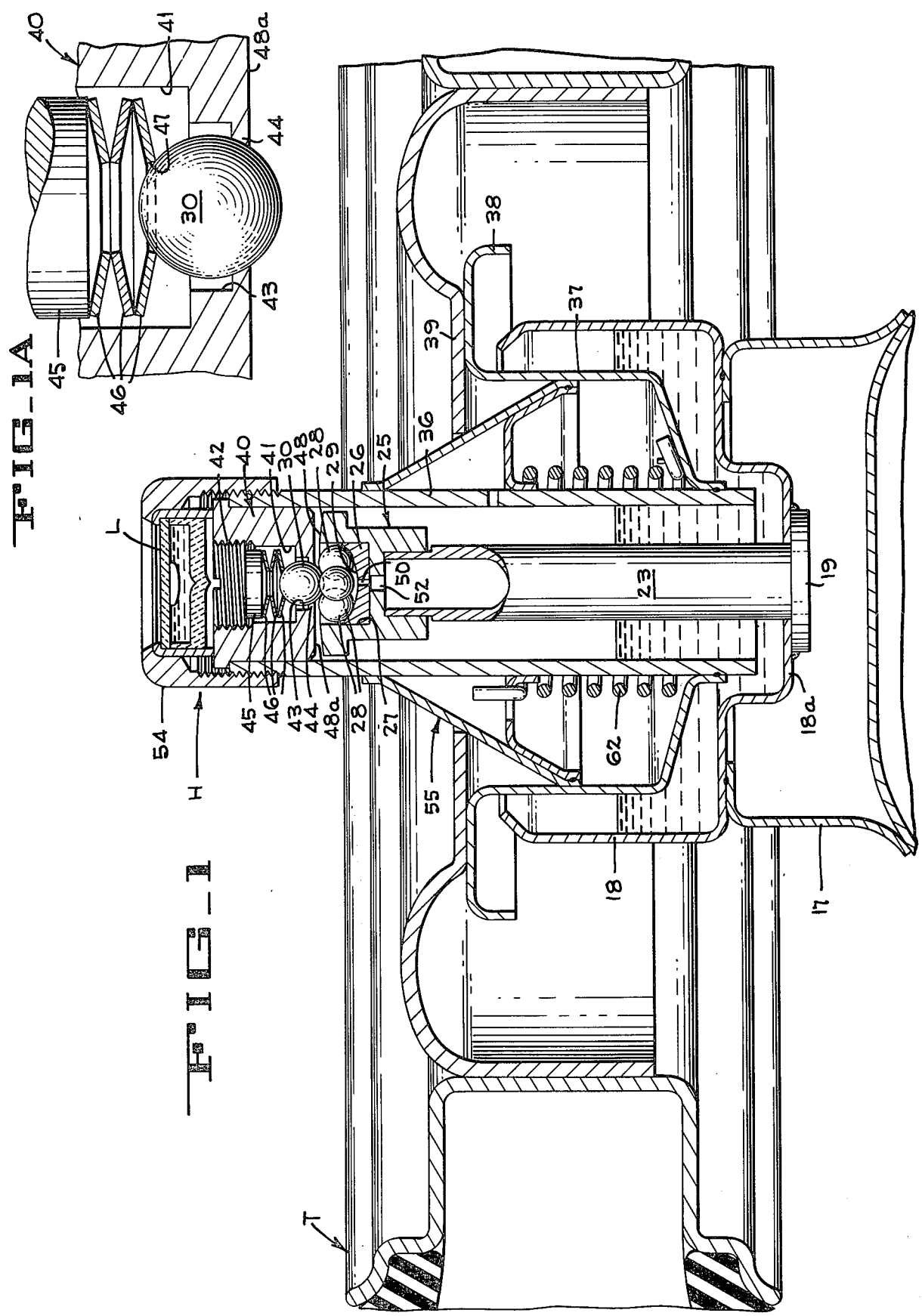

STATIC WHEEL BALANCER

BACKGROUND OF THE INVENTION

1. Field of the Invention

This invention relates to static wheel balancers for determining the balance of vehicle wheels, and more particularly, it relates to static wheel balancers of the type having a pivot ball for supporting a wheel balancing head upon a vertical support post.

2. Description of the Prior Art

The principle of a common type of static wheel balancer is in itself a simple one. The wheel (with a mounted tire) is placed on a wheel balancing head mounting a bubble level for indicating unbalance. The head is supported by a hard steel ball or sphere which rests on the anvil of a post or other vertical support means that is normally coaxial with the wheel and balancing head. If the wheel to be balanced is out of balance, the wheel balancing head will tilt out of a horizontal plane, and this tilt will manifest itself by an off-center reading of the bubble level. The balance error is usually corrected by the application of one or more balance weights to the rim flange of the wheel. Balancers of this type subject the pivot ball and supporting structure to shock loads if a heavy wheel and tire assembly is initially dropped onto the balancing head while the pivot ball is supported by the anvil, and special means are often provided to protect the ball from these heavy shock loads.

The U.S. Pat. No. 3,055,221, issued Sept. 25, 1922 to Bageman et al. discloses a static wheel balancer of the afore-described type having a vertical support post formed with a flat faced tappet or anvil. The balancing head is pivotally supported on the anvil by a pivot ball rigidly mounted in the balancing head. A cam mechanism is provided to lower the anvil so that the balance head rests on a support sleeve projecting from the base of the balancer when the wheel is first placed on the balance head. The anvil must be mechanically lifted to support and free the balance head for wheel balancing.

A similar pivot ball and anvil construction for supporting the balancing head is shown in U.S. Pat. No. 3,164,996 issued Jan. 12, 1965 to Carrigan and assigned to the FMC Corporation. This patent also shows structure for lowering the anvil during initial wheel application, and the anvil must be mechanically lifted for the balancing operation. Furthermore, in this patent, the wheel centering cone of the balancing head is resiliently supported to minimize damage to the pivot ball and the supporting anvil from impacts that occur when a wheel assembly is dropped onto the balancing head. The latter feature is incorporated in the preferred embodiment of the present invention.

The U.S. Pat. No. 3,280,640, issued Oct. 25, 1960 to Fuertges, also employs a single pivot ball rigidly mounted on the balance head and supported on an anvil. In this patent, the anvil post is slidably mounted in a post support and guide sleeve. The post is initially lifted from its wheel balancing position by a spring. When the wheel is placed on the balancing head, the post is lowered against the force of the spring until the lower end of the post is solidly seated on a shoulder at a lower portion of the sleeve. Oil bleed holes in the sleeve, valved by the descending post, are provided to control deceleration of the post until it bottoms out on the sleeve shoulder for the balancing operation.

SUMMARY OF THE INVENTION

The balancing head of the present invention employs a single pivot ball which is pivotally mounted on pivot structures supported by a post. In accordance with the present invention, the balance head supporting post can be rigidly mounted on the base structure which supports the balancer on the floor. There is no need for providing mechanical devices for initially lowering the pivot ball supporting anvil so that the balancing head is supported directly on a support sleeve as in the aforesaid Bageman et al. and Carrigan patents. Also, the post need not be spring mounted with a hydraulic oil bleed system as in the aforesaid Fuertges patent. It is noted that with all its complexities, the anvil mounting of the Fuertges patent provides a hydraulic block in cases of instantaneous shock loadings.

In accordance with the present invention, the balancing head is provided with the usual sleeve member which mounts the wheel centering cone and a wheel support flange. A bubble level is clamped to the upper end of the balance head sleeve. The upper portion of the sleeve is provided with a pivot ball socket member having a lip for limiting downward motion of the ball. The ball is preloaded against the lip, preferably by an assembly comprising a plurality of Belleville spring washers which are preloaded to provide a predetermined preload force on the ball. During normal operation, the socket member that mounts the pivot ball on the balancing head has a lower face that is spaced a short distance (such as about 1/32 inches) from an upper face of the supporting post. Thus, when excessive shock loads are applied to the balancing head (as would occur when an operator drops a heavy tire and wheel assembly on the balancing head flange) the resultant shock load on the pivot ball and its supporting structure will be absorbed by the deflection of the Belleville washers. Under heavy shock loads, the Belleville washers are compressed until the lower face of the ball mounting socket member is forced against the upper face of the supporting post, thereby positively protecting the pivot ball and its supporting structure from excess shock loading. During the balancing operation, the aforesaid two faces are spaced from one another by full extension of the Belleville washers and the parts are so formed that the balancing head can tilt relative to the post and the Belleville washers will retain the pivot ball in its lowermost position against a retainer lip in the ball mounting socket.

In the preferred embodiment of the invention, the Belleville washers are preloaded by a threaded plug that is threaded into a cup shaped socket in the pivot ball mounting member. The threaded plug engages the upper end of the Belleville washer assembly. The lowermost Belleville washer, which engages the ball, is disposed so that the apex of its conical surface points downwardly. The aperture in the lowermost Belleville washer is smaller than the diameter of the pivot ball so that the Belleville washer acts along the axis of the ball. The upper face of the ball support structure on the post is convexly bevelled or relieved so that the aforesaid small clearance between the faces can be provided without interfering with the tilting action of the balancing head during the wheel balancing operation.

In the preferred embodiment of the invention, instead of using a single pivot ball and a flat surface supporting anvil, as shown in typical balancers illustrated by the above-mentioned patents, a more rugged pivot ball assembly is employed. This pivot assembly includes an anvil mounted on the upper end of the post having a concave spherical surface that supports three equal diameter support balls. The pivot ball on the balancing head, preloaded by the Belleville washers as mentioned above, is supported by the aforesaid three support balls. This structure makes it unnecessary to use a small diameter pivot ball on the balancing head (such as 3/32 inches in the commercial embodiment of the aforesaid Carrigan patent) and makes it possible to use a larger diameter pivot ball without introducing balancing errors in cases wherein the balancer is not levelled. Since the larger diameter pivot ball is inherently more rugged than the single small pivot ball of the aforesaid patents, the aforesaid three ball construction makes it particularly feasible to rely solely on the relatively heavily preloaded Belleville washer assembly of the present invention for absorbing shock loads.

The four ball pivot structure per se, referred to above, is the preferred embodiment of the copending application of Roberts, Ser. No. 633,779, filed Nov. 20, 1975, assigned to the FMC Corporation and the preferred embodiment will be described in association with the pivot ball mounting structure of the present invention.

The manner in which the aforesaid advantages may be obtained will be apparent from the following description of the preferred embodiment of the invention.

BRIEF DESCRIPTION OF THE DRAWINGS

FIG. 1 is a vertical section through a balancer embodying the present invention with a wheel mounted on the balancer.

FIG. 1A is an enlarged fragmentary section showing the pivot ball and Belleville washer assembly.

DESCRIPTION OF THE PREFERRED EMBODIMENT

Referring to FIGS. 1 and 1A, the balancer of the present invention will be seen to comprise a supporting base 17 to which is welded an annular bowl 18 that has a cup shaped lower central portion 18a. The bottom of base 17 is formed with means (not shown) for support by the floor which may include levelling screws for very coarse levelling or which may not require levelling screws when supported on reasonably level surfaces.

A circular plate 19, welded to the underside of the recessed portion 18a of the bowl 18, carries a vertically extending tubular pedestal or post 23 which projects upwardly through the bowl. A cup shaped anvil mounting member 25 is pressed on the upper, reduced diameter end of the post. The member 25 mounts a hardened steel anvil 26, which is disposed in the lower end of a cup shaped cylindrical recess 27 of the member 25, to define a cup-like retainer for three hardened steel support balls 28. The three balls 28, which have identical diameters, are in rolling contact with an upwardly facing concave spherical surface 29 of the anvil 26.

A pivot ball 30 is mounted in a balancing head H and rests on the support balls 28. Preferably the pivot ball 30 is larger than the support balls 28, but this is not essential. In the preferred embodiment, the sphere 30 is a hardened steel ball having a diameter of ½ inch and the hardened support balls 28 have a diameter of ⅜ inch. This four ball pivot and anvil assembly per se is claimed in the copending application of Roberts, Ser. No. 633,779 filed Nov. 20, 1975 and assigned to the FMC Corporation.

The balancing head H comprises a central sleeve 36 having a cup-shaped wheel supporting member 37 welded to its lower end portion. The wheel supporting member 37 is provided with an upper radial flange 38 which supports the lug flange 39 of the tire and wheel assembly T during the balancing operation.

In accordance with the present invention, in order to mount the pivot ball 30 and a level in the balancing head, a cylindrical cup shaped plug 40 is received within the upper end of the sleeve 36, as by a press fit. The plug 40 has an upwardly opening central cup or recess 41 (FIG. 1A) into which a preload screw 42 (FIG. 1) is threaded. Near its lower end the plug 40 has a reduced diameter opening 43 (FIG. 1A) to provide a socket which slidably receives the pivot ball 30. The reduced diameter opening 43 terminates in a ball retaining lip 44 which has a partial spherical surface that engages the ball 30. The lower end of the preload screw 42 is formed with a pad 45 (FIG. 1) which engages the upper end of an assembly of three Belleville washers 46 to urge them downwardly to resiliently retain the ball 30 against the lip 44. The lowermost Belleville washer is disposed so that its apex points downwardly and its smaller opening 47 (FIG. 1A) receives the upper portion of the pivot ball 30. The spring rate of the Belleville washer assembly is so chosen and the preload screw 42 is so adjusted that during the balancing operation the preload force of the springs more than overcomes the weight of the wheel and tire assembly and holds the sphere 30 against the lip 44 for support by the three lower spheres.

The upper face 48 of the support ball retainer 25 is convexly beveled slightly to clear the opposed lower face 48a of the plug 40 during balancing. The normal clearance between these opposed faces 48, 48a is about 1/32 inches and for normal vehicle wheel balancing the Belleville springs are preloaded to exert a force of about 100 pounds on the pivot ball 30. Thus, in cases where the springs are deflected by shock loads that exceed the preload of 100 pounds, the ball 30 will deflect the Belleville washers and will be forced up into the socket 43. When this occurs, the upper face 48a will engage the lower face 48 and transmit such excess loads and shocks directly to the support post 23.

The anvil plate 26 is apertured at 50 which aperture is aligned with an aperture 52 in the anvil mounting member 25 to drain any liquid that might accumulate on the upper spherical anvil surface.

As in the aforesaid Carrigan U.S. Pat. No. 3,164,996, a spirit level L is clamped against the upper face of the plug 40 by a threaded cap 54, for indicating wheel unbalance. Also, as in the Carrigan patent, a wheel-centering cone assembly 55 is slidably mounted on the sleeve 36 and within the bowl 37 of the balancing head. The cone assembly is urged upwardly by a spring 62 which surrounds the sleeve 36. When a wheel T is placed on the balancing head H, the cone assembly 55 centers the wheel and the cone is depressed from its uppermost position (not shown) against the force of the spring 62 by the weight of the wheel to the position shown in FIG. 1, wherein the wheel lug flange 39 rests on the balancing head flange 38. This compression of the spring 62 assists in cushioning the shock of dropping a wheel on the balance head. The bowl 18 contains oil for damping oscillations of the head during the balancing operation.

In operation, the threaded plug 42 is adjusted to compress the Belleville washers 46 so that they provide the desired preload force on the pivot ball 30, which force must be sufficient to urge the ball 30 against the lip 44 with a force that will more than sustain the weight of the wheel and tire assembly T mounted on the balancing head. Theoretically, the preload force on the Belleville washers need only be great enough to support the wheel without deflection of the ball from its retaining lip 44 under the weight of the heaviest wheel that is normally encountered during balancing. In practice, the preload force exceeds the weight of the wheel somewhat to provide a factor of safety. This limiting of the preload force provides for the shock cushioning action of the Belleville washers previously mentioned, wherein the ball 30 is lifted from its retaining lip 44 under heavy shock loads. In a typical example, the preload force of the Belleville washer assembly will be in the order of 100 pounds. Under excessive shock loads, the upper face 48a of the plug 40 will, as the Belleville washers are compressed by the ball 30, be brought into engagement with the face 48 of the anvil mounting member 25. Thus, the balancing head will be solidly supported on the post 23, and the ball 30 as well as the support balls 28 are protected against shock loads that substantially exceed the preload force on the ball 30. As previously mentioned, but in a normal range of wheels balanced on the embodiment disclosed, the clearance between the faces 48, 48a will be in the order of 1/32 inch. This small clearance does not interfere with the balancing action because the face 48 is convexly beveled. Of course, the face 48 could be flat and the face 48a convexly beveled, which is a mere reversal of parts that provides a mode of operation identical to that illustrated.

Although the best mode contemplated for carrying out the present invention has been herein shown and described, it will be apparent that modification and variation may be made without departing from what is regarded to be the subject matter of the invention.

What I claim is:

1. In a wheel balancer of the type comprising a post having a generally vertical axis, means for supporting said post on the floor, pivot ball support means on an upper portion of said post, a wheel balance head having means for mounting and centering a wheel to be balanced in a plane that is normally horizontal, a level on said head, and means for mounting a pivot ball on said balance head for support by the ball support means on said post; the improvement wherein said pivot ball mounting means comprising a pivot ball socket member on an upper portion of said balance head, metallic spring means comprising an assembly of Belleville washers in said socket member and engaging an upper portion of said pivot ball, and means for preloading said spring means against said ball, for absorbing shock loads imparted to said balance head, said preloading means comprising a threaded plug in said socket member for adjusting the preload of said Belleville washers.

2. The balancer of claim 1, wherein said pivot ball support means is formed with an upwardly facing stop face, said pivot ball mounting means being formed with an opposed, downwardly facing stop face, said faces being normally relatively close together, shock loads on said balance head that exceed the preload on said Belleville washers bringing said balance head face against the face on said pivot ball support means for protecting the pivot structure against overload.

3. The balancer of claim 2, wherein one of said stop faces is convexly beveled to accommodate tilting of the balance head without bringing said stop faces into mutual engagement.

4. In a wheel balancer of the type comprising a post having a generally vertical axis, means for supporting said post on the floor, pivot ball support means on an upper portion of said post, a wheel balance head having means for mounting and centering a wheel to be balanced in a plane that is normally horizontal, a level on said head, and means for mounting a pivot ball on said balance head for support by the ball support means on said post; the improvement wherein said pivot ball mounting means comprising a pivot ball socket member on an upper portion of said balance head, metallic spring means in said socket member and engaging an upper portion of said pivot ball, and means for preloading said spring means against said ball, for absorbing shock loads imparted to said balance head, said metallic spring means comprising an assembly of Belleville washers, said washer assembly being disposed so that the apex of the Belleville washer that engages said pivot ball points down, said washer having an aperture that is smaller than the diameter of said ball for receiving an upper portion of the ball.

* * * * *